United States Patent
Li et al.

(10) Patent No.: US 11,411,630 B2
(45) Date of Patent: Aug. 9, 2022

(54) BEAM-STRENGTH RELATED TYPE-II CHANNEL STATE INFORMATION COEFFICIENT FEEDBACK

(71) Applicant: QUALCOMM Incorporated, San Diego, CA (US)

(72) Inventors: Qiaoyu Li, Beijing (CN); Min Huang, Beijing (CN); Liangming Wu, Beijing (CN); Chenxi Hao, Beijing (CN); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/312,327

(22) PCT Filed: Dec. 19, 2019

(86) PCT No.: PCT/CN2019/126503
§ 371 (c)(1),
(2) Date: Jun. 9, 2021

(87) PCT Pub. No.: WO2020/125706
PCT Pub. Date: Jun. 25, 2020

(65) Prior Publication Data
US 2022/0029683 A1    Jan. 27, 2022

(30) Foreign Application Priority Data
Dec. 21, 2018 (CN) .................. PCT/CN2018/122798

(51) Int. Cl.
*H04B 7/02* (2018.01)
*H04B 7/06* (2006.01)
*H04B 17/318* (2015.01)

(52) U.S. Cl.
CPC ......... *H04B 7/0626* (2013.01); *H04B 17/318* (2015.01)

(58) Field of Classification Search
CPC .......................... H04B 7/0626; H04B 17/318
USPC ........................................................ 375/267
See application file for complete search history.

(56) References Cited

U.S. PATENT DOCUMENTS

| | | | |
|---|---|---|---|
| 11,050,476 B2* | 6/2021 | Wu | ........................ H04L 5/0053 |
| 2007/0041289 A1* | 2/2007 | Mitsuda | ............... G11B 7/0941 |
| | | | 369/44.29 |
| 2017/0164100 A1* | 6/2017 | Franck | ................... H04R 1/403 |
| 2018/0167116 A1 | 6/2018 | Rahman et al. | |
| 2018/0262253 A1 | 9/2018 | Rahman et al. | |

(Continued)

FOREIGN PATENT DOCUMENTS

| | | |
|---|---|---|
| CN | 107105439 A | 8/2017 |
| CN | 108023624 A | 5/2018 |

(Continued)

OTHER PUBLICATIONS

International Search Report and Written Opinion—PCT/CN2018/122798—ISA/EPO—dated Sep. 20, 2019.

(Continued)

*Primary Examiner* — Helene E Tayong
(74) *Attorney, Agent, or Firm* — QUALCOMM Incorporated

(57) ABSTRACT

Certain aspects of the present disclosure provide techniques for reporting beam-strength related Type-II channel state information (CSI) coefficient feedback.

30 Claims, 12 Drawing Sheets

(56) References Cited

U.S. PATENT DOCUMENTS

| | | |
|---|---|---|
| 2018/0302140 A1 | 10/2018 | Rahman et al. |
| 2018/0309490 A1 | 10/2018 | Rahman et al. |
| 2019/0089442 A1* | 3/2019 | Akoum .................. H04L 5/005 |
| 2020/0153498 A1* | 5/2020 | Kotecha ............... H04B 7/0695 |

FOREIGN PATENT DOCUMENTS

| | | |
|---|---|---|
| CN | 108063631 A | 5/2018 |
| CN | 108111200 A | 6/2018 |
| WO | 2018223351 | 12/2018 |

OTHER PUBLICATIONS

International Search Report and Written Opinion—PCT/CN2019/126503—ISA/EPO—dated Mar. 18, 2020.

\* cited by examiner

Rank of the DFT basis $M = 8$.
Number of beams is $B = 8$.
Overall number of coefficients to feedback $M_{total} = 13$.

| $M_1$ | $M_2$ | $M_3$ | $M_4$ | $M_5$ | $M_6$ | $M_7$ | $M_8$ |
|---|---|---|---|---|---|---|---|
| 2 | 2 | 2 | 2 | 2 | 1 | 1 | 1 |

FIG. 11

Number of beams is $B = 8$.
Overall number of coefficients to feedback $M_{total} = 26$.
There are overall 3 wide-band amplitude levels, wherein
– The $1^{st}/2^{nd}/3^{rd}$ strongest wide-band amplitude level requires 4/3/2 coefficients per beam, which is RRC configured.

| $M_1$ | $M_2$ | $M_3$ | $M_4$ | $M_5$ | $M_6$ | $M_7$ | $M_8$ |
|---|---|---|---|---|---|---|---|
| 4 | 4 | 4 | 4 | 4 | 3 | 3 | 2 |

FIG. 12

Number of beams is $B = 8$.

Overall number of coefficients to feedback $M_{total} = 26$.

There are overall 3 wide-band amplitude levels, wherein
- All wide-band amplitude levels uses 3 bits to feedback wide-band amplitude and 1 bit to feedback wide-band phase.
- The $1^{st}/2^{nd}/3^{rd}$ strongest wide-band amplitude level requires 4/3/2 coefficients per beam and {3,3}/{2,2}/{1,1} bits differential {amplitude, phase} quantization, which are both RRC configured.

| $M_1$ | $M_2$ | $M_3$ | $M_4$ | $M_5$ | $M_6$ | $M_7$ | $M_8$ |
|---|---|---|---|---|---|---|---|
| 4 | 4 | 3 | 3 | 3 | 3 | 2 | 2 |

FIG. 13

BEAM-STRENGTH RELATED TYPE-II CHANNEL STATE INFORMATION COEFFICIENT FEEDBACK

CROSS-REFERENCE TO RELATED APPLICATIONS

This application is a national stage application under 35 U.S.C. 371 of PCT/CN2019/126503, filed Dec. 19, 2019, which claims benefit of and priority to International Patent Cooperation Treaty Application No. PCT/CN2018/122798, filed Dec. 21, 2018, which are hereby assigned to the assignee hereof and hereby expressly incorporated by reference herein in their entireties as if fully set forth below and for all applicable purposes.

FIELD OF THE DISCLOSURE

Aspects of the present disclosure relate to wireless communications, and more particularly, to techniques for beam-strength related Type-II channel state information (CSI) coefficient feedback.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method of wireless communications by a user equipment (UE). The method generally includes measuring beam-specific amplitude levels of a plurality of beams based at least on channel state information reference signals (CSI-RS); selecting transfer domain coefficients from a coefficient compression matrix, with a constraint on the total quantity of selected coefficients, for reporting coefficient-specific amplitude and phase information to a BS, wherein a quantity of transfer domain coefficients selected for each beam is based at least on the corresponding beam-specific amplitude level; determining the coefficient-specific amplitude and phase values based on a quantity of bits used for reporting the UE-specific amplitude and phase, wherein the quantity of bits used for reporting the UE-specific amplitude and phase values is based at least on the beam-specific amplitude level of the beam associated with the particular selected coefficient; reporting feedback information to the BS, as a part of CSI feedback, the feedback information comprising: the measured beam-specific amplitude levels; and a difference on the quantity of selected transfer domain coefficients selected for a first beam-specific amplitude level compared to a second beam-specific amplitude level, wherein the second beam-specific amplitude level has one of a stronger amplitude level and a weaker amplitude level compared to the first beam-specific amplitude level, and the coefficient-specific amplitude and phase information for the selected coefficients.

Certain aspects provide a method of wireless communications by a base station (BS). The method generally includes transmitting channel state information reference signals (CSI-RS) to a user equipment (UE); receiving, from the UE, feedback information as a part of CSI feedback, the feedback information comprising: measured beam-specific amplitude levels for a plurality of beams; and a difference on a second quantity of selected transfer domain coefficients for a first beam-specific amplitude level compared to a second beam-specific amplitude level, wherein the second beam-specific amplitude level has one of a stronger amplitude level and a weaker amplitude level compared to the first beam-specific amplitude level, and coefficient-specific amplitude and phase information for the selected transfer domain coefficients; and adjusting a configuration of one or more antennas of the BS based on the feedback information.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 11 illustrates an example of a beam-strength related Type-II coefficient feedback process, according to aspects of the present disclosure.

FIG. 12 illustrates an example of a beam-strength related Type-II coefficient feedback process, according to aspects of the present disclosure.

FIG. 13 illustrates an example of a beam-strength related Type-II coefficient feedback process, according to aspects of the present disclosure.

Figure 1:
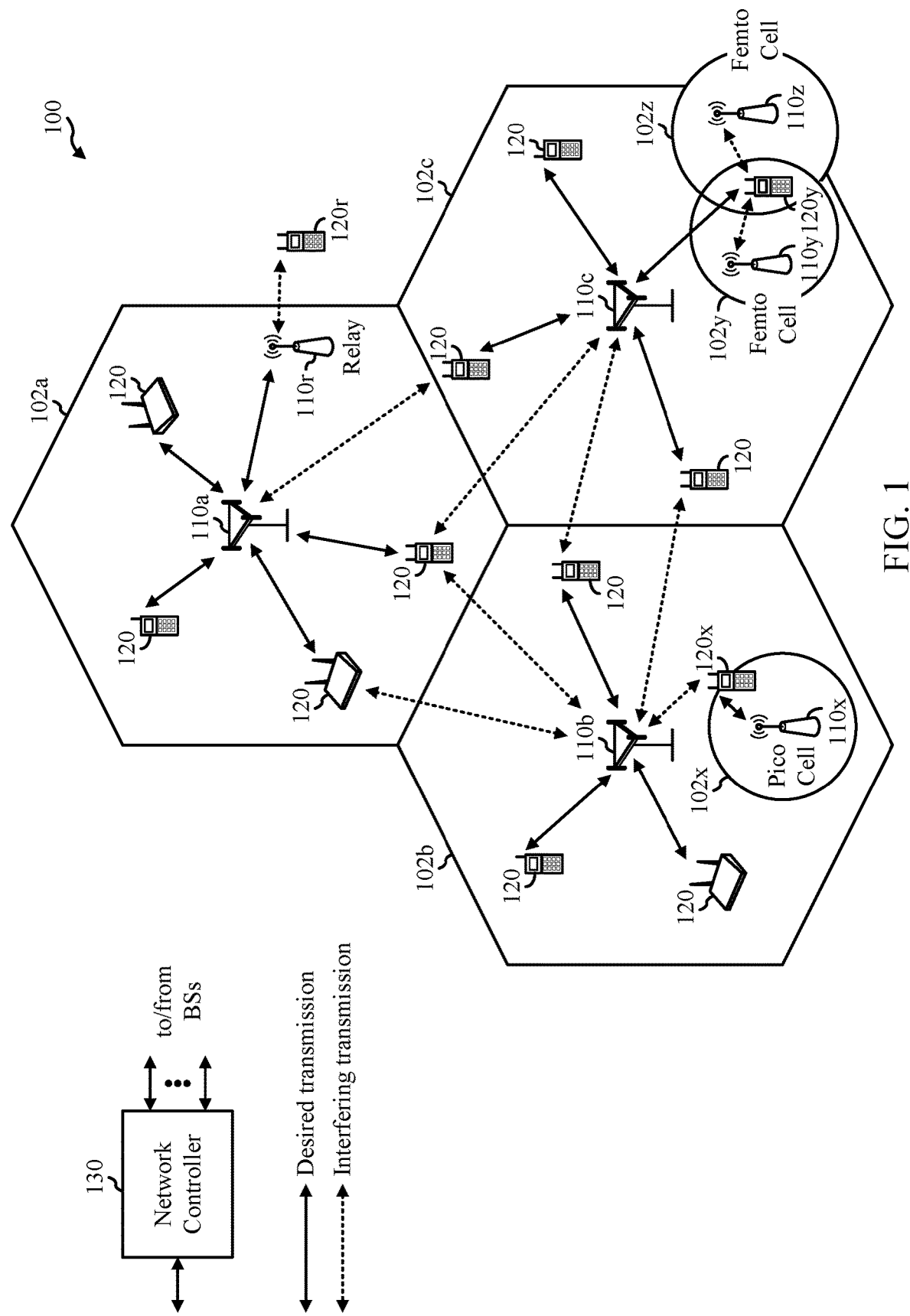
FIG. 1 is a block diagram conceptually illustrating an example telecommunications system.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

DETAILED DESCRIPTION

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the user equipments (UEs) 120 (e.g., 120x, 120y, etc.) may be configured to perform operations of FIG. 9 to measure and report channel state information, while base stations (BS) 110 may be configured to perform operations of FIG. 10 to receive and process CSI feedback. The UEs and BS may also be configured to measure, report, and process beam-strength related Type-II channel state information coefficient feedback.

The wireless communication network 100 may be, for example, a New Radio (NR) or 5G network. In another example, the wireless communication network 100 may be an LTE network.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
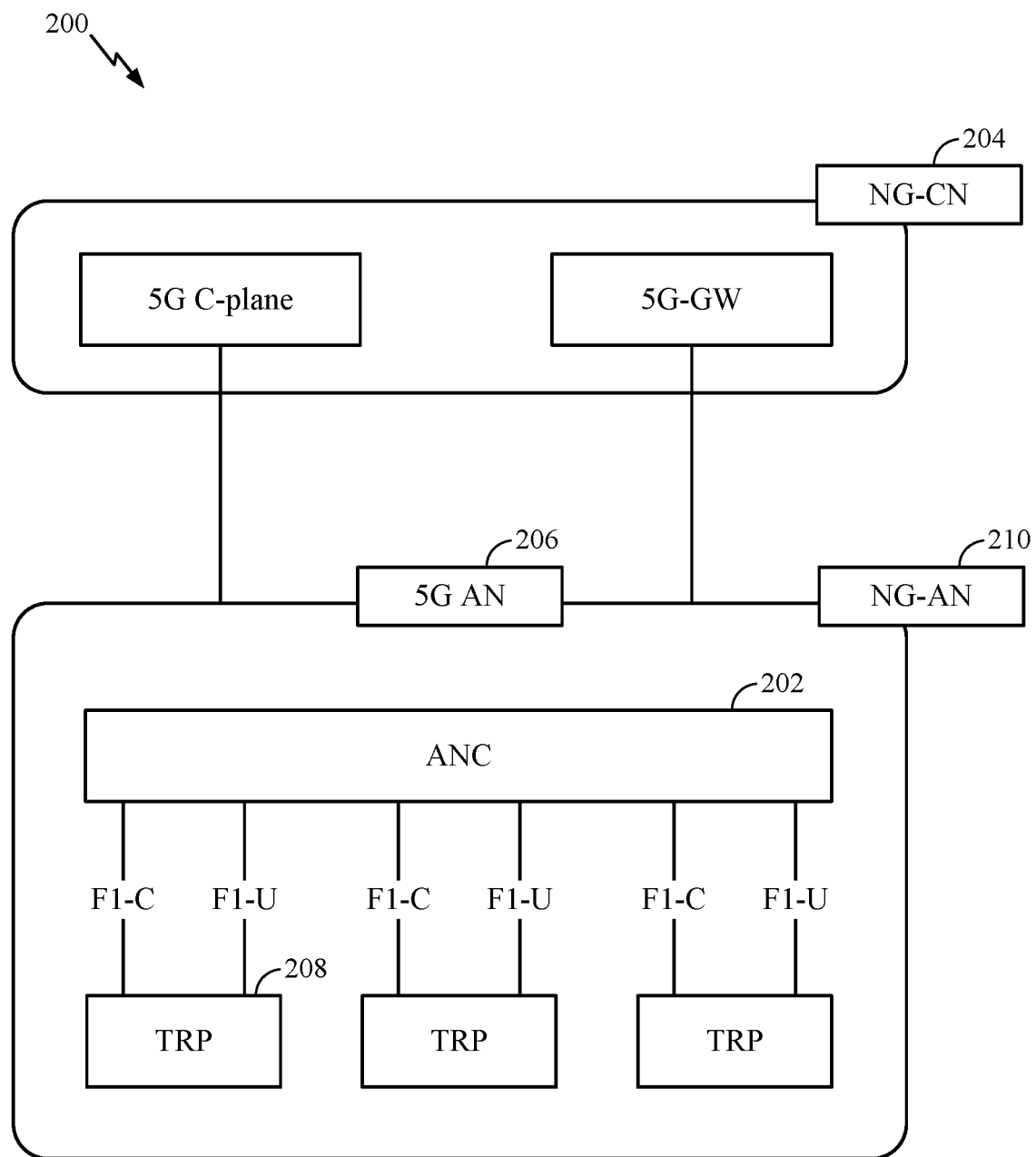
FIG. 2 is a block diagram illustrating an example logical architecture of a distributed radio access network (RAN).

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
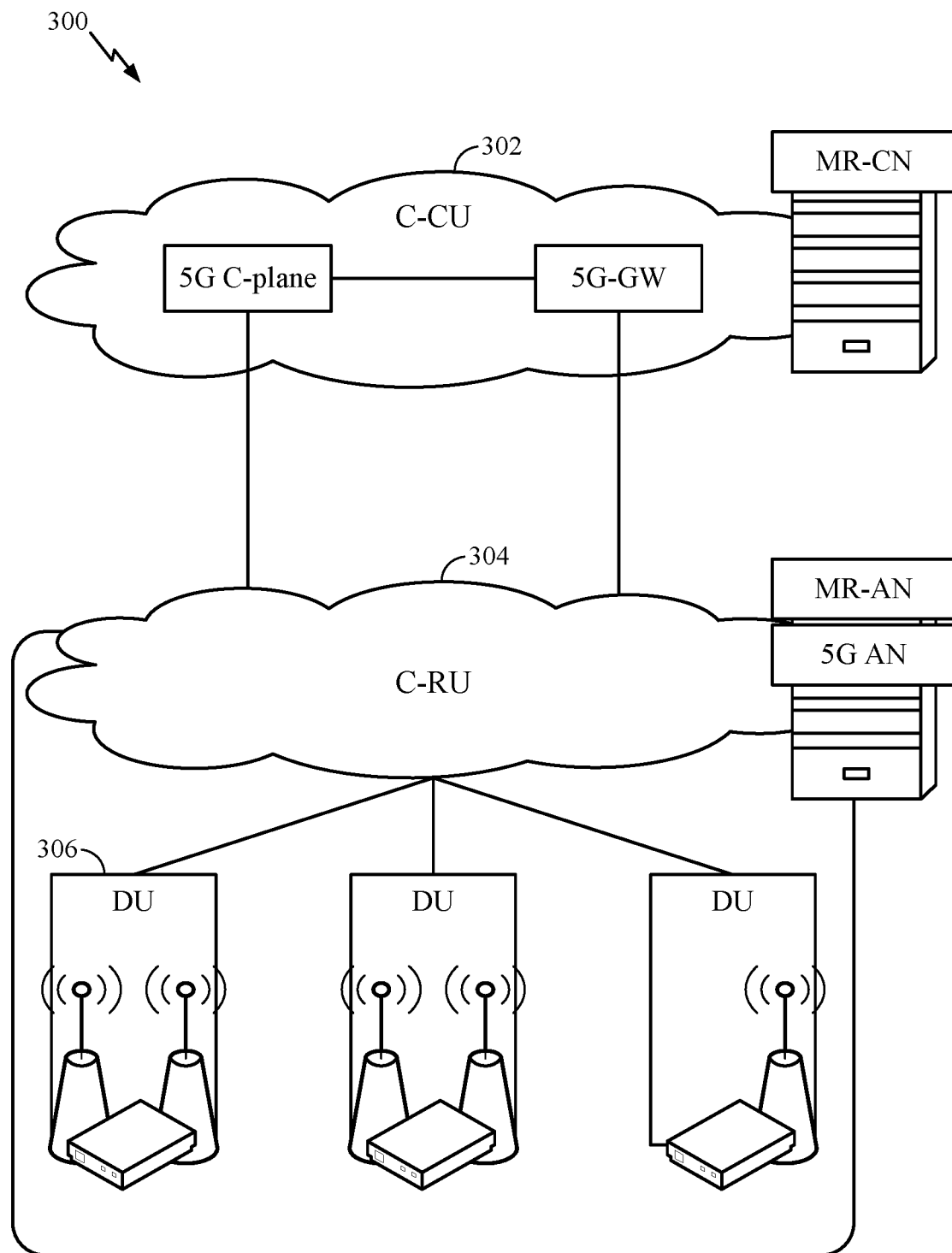
FIG. 3 is a diagram illustrating an example physical architecture of a distributed RAN.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
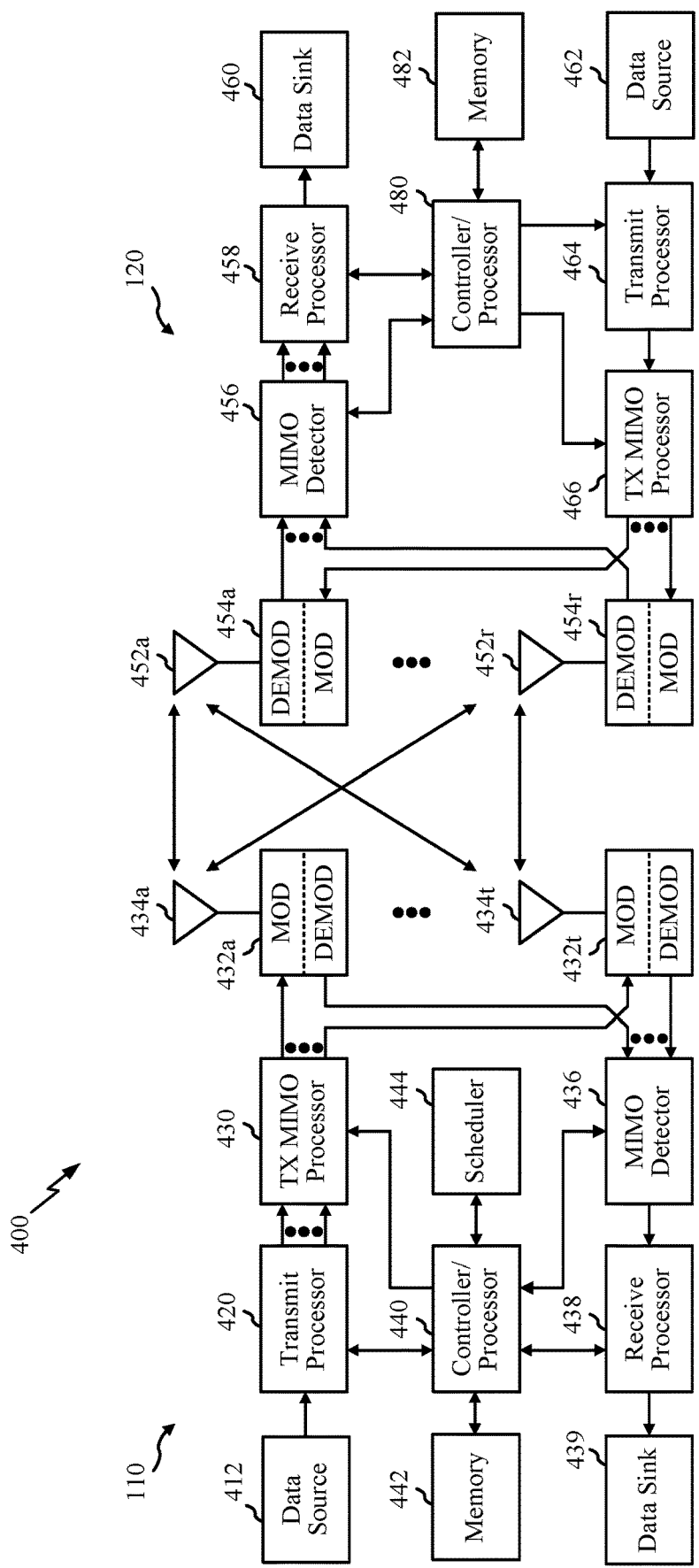
FIG. 4 is a block diagram conceptually illustrating a design of an example base station (BS) and user equipment (UE).

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein (e.g., operations described in FIGS. 9-10).

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
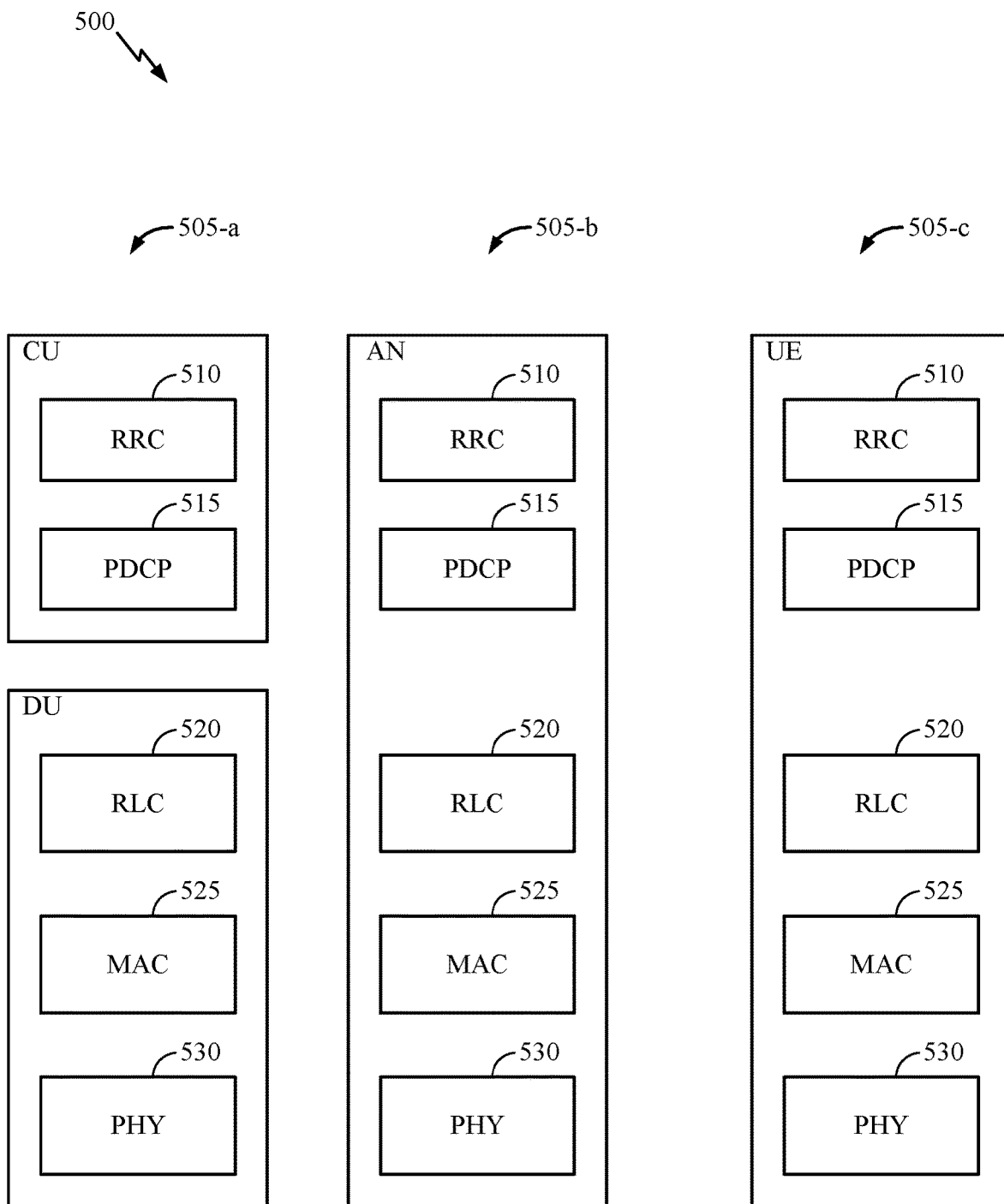
FIG. 5 is a diagram showing examples for implementing a communication protocol stack.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
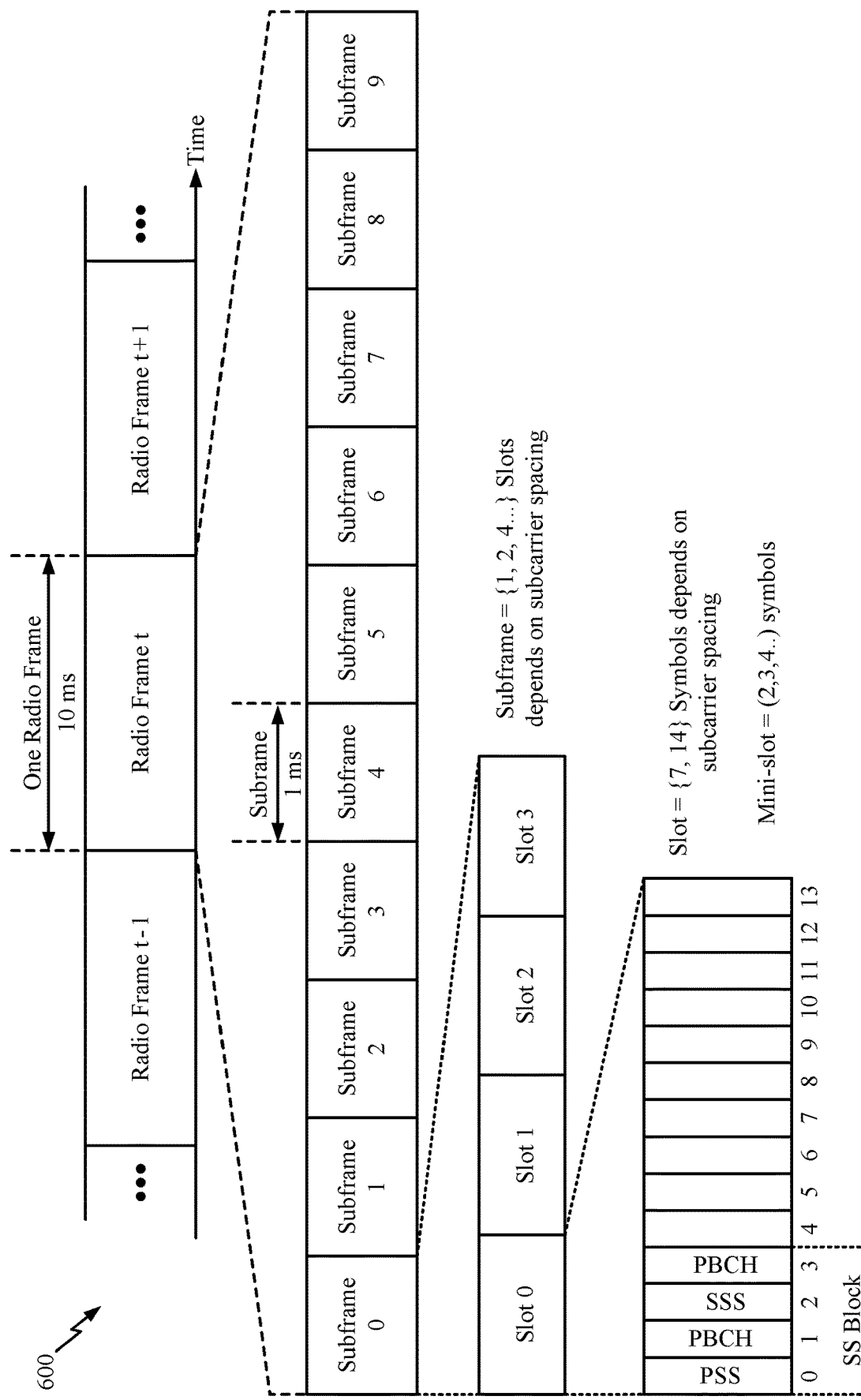
FIG. 6 illustrates an example of a frame format for a new radio (NR) system.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Channel State Information (CSI) Feedback

As channel conditions between a user equipment (UE) and a base station (BS) change, it is important for the UE to periodically or aperiodically report certain indications (e.g., channel quality indicator (CQI), precoding matrix index (PMI), and rank indicator (RI)) about the latest channel conditions to the BS. In certain aspects, the UE transmits a CSI report to the BS to indicate channel conditions to the BS. The BS then utilizes the received CSI report to improve communications with the UE. In certain aspects, such as under the NR-5G standards, CSI reporting with two types of spatial information feedback is supported. Type I CSI feedback is the CSI feedback scheme that is also used by wireless communications devices comporting to the LTE standards. Type I CSI feedback comprises codebook-based PMI feedback with normal spatial resolution. Type II CSI feedback is an enhanced feedback scheme, enabling explicit feedback and/or codebook-based feedback with higher spatial resolution.

Figure 7:
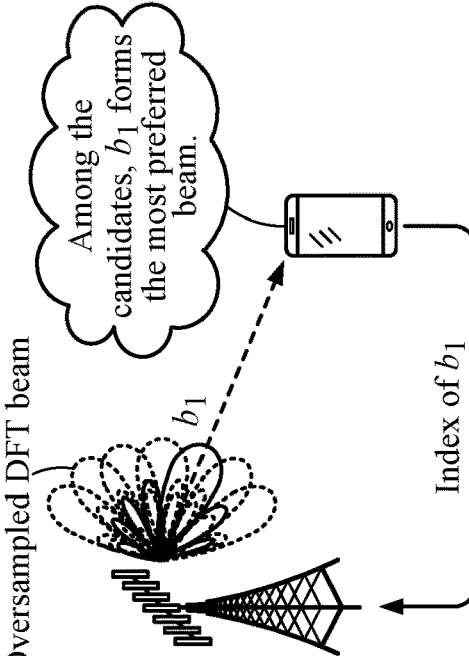
FIG. 7 shows a comparison between the Type 1 and Type 2 precoder feedback.

FIG. 7 shows a comparison between the Type 1 and Type 2 precoder feedback. As shown, a Type I CSI feedback corresponds to a lower resolution and smaller payload while Type II CSI corresponds to a higher resolution and larger payload. That is because Type II CSI feedback includes information regarding linear combination of different beams identified from a codebook, such as amplitude, phase, etc. of transmit antennas associated with different widebands and subbands.

For Type II CSI feedback, at least one of Categories 1, 2, and/or 3 may be used. Category 1 relates to reporting a precoder feedback based on a linear combination of dual-stage codebooks. In certain aspects, a linear combination of the dual-stage codebooks supports up to 4 beam combinations with a certain precoder structure. For example, the PMI codebook may assume the following precoder structure:

For rank 1:

$$W = \begin{bmatrix} \tilde{w}_{0,0} \\ \tilde{w}_{1,0} \end{bmatrix} = W_1 W_2,$$

where W is normalized to 1. $W_1$ and $W_2$ indicate precoding weights for rank 1 (or transmission layer 1). For rank 2:

$$W = \begin{bmatrix} \tilde{w}_{0,0} & \tilde{w}_{0,1} \\ \tilde{w}_{1,0} & \tilde{w}_{1,1} \end{bmatrix} = W_1 W_2,$$

where columns of W are normalized to $$\frac{1}{\sqrt{2}}.$$

Based on such a precoder structure, the UE may feed the following information back to the BS: $\tilde{w}_{r,l} = \sum_{i=0}^{L-1} b_{k_1^{(i)} k_2^{(i)}} \cdot p_{r,l,i}^{(WB)} \cdot p_{r,l,i}^{(SB)} \cdot c_{r,l,i}$ (weighted combination of L beams). In this formula, r stands for polarization and l stands for transmission layer. In addition, up to L wideband orthogonal beams are selected. In addition, as shown, the UE reports the wideband amplitude as well as the subband differential amplitude. Also, a number or quantity of bits (e.g., 2 or 3 bits) are used to report the subband phase with amplitude dependent quantization.

As shown, because Type II CSI reporting provides a higher resolution (more granular channel information over a number or quantity of subbands, transmission layers, and/or beams etc.), the overhead associated with Type II CSI reporting is large even if the reporting is performed for only two transmission layers (e.g., up to rank 2). For example, the total PMI bits may be more than, for example, 900 bits in worst case for 3GPP's Rel. 15 type-II CSI. Also, trivial extension to a higher rank may result in even larger payload bits. In addition, payload (or overhead) increases linearly as the number or quantity of beams and/or ranks increases.

Figure 8:
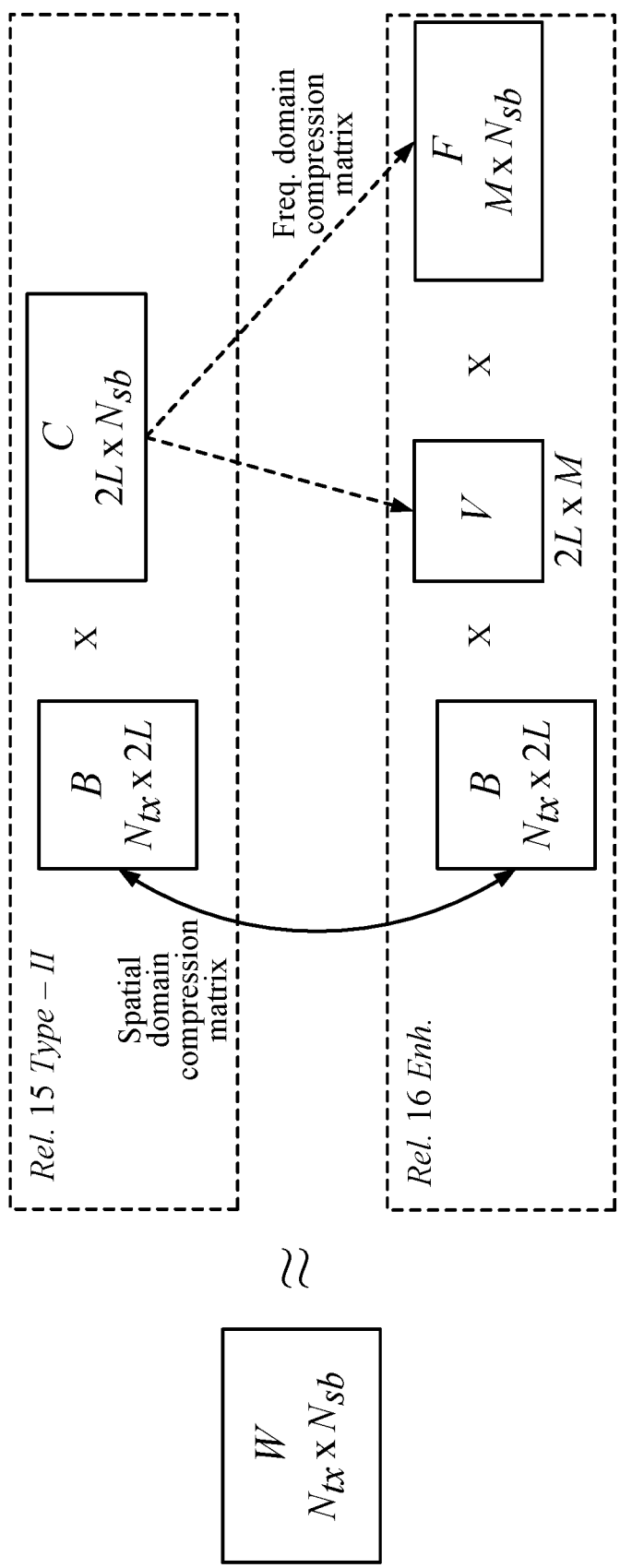
FIG. 8 illustrates an example flow diagram of overhead reduction for Type-II channel state information feedback in different feedback systems, according to aspects of the present disclosure.

FIG. 8 shows a comparison of different types of feedback. Because the quantity of subbands can be relatively large, the overall overhead for Type-II CSI feedback in current feedback systems can also be large. Thus, to reduce the overhead, some feedback systems transfer the subband coefficients in a current feedback system into another domain (e.g., discrete Fourier Transform (DFT) basis domain, discrete cosine transfer (DCT) domain) and selects only the dominant coefficients associated with each beam in the transformed domain to feedback. For example, C is spatial compression matrix in a current feedback system and as shown in FIG. 8, is transformed into two different matrices in another feedback system: V, which is a coefficient compression matrix with dimensions 2L×M, and F, which is a frequency domain compression matrix with dimensions M×$N_{sb}$, where M≤$N_{sb}$, $N_{sb}$ is the quantity of subbands, and M is the quantity of coefficients. In one embodiment, the overall quantity of identified beams from the Type-II codebook is B=2L, where the number 2 is due to the consideration of antenna polarization. For the coefficients in the transferred domain associated with the bth beam, the quantity of coefficients in the transferred domain associated with this beam to feedback is denoted by $M_b$ and thus $M_{total} = \sum_{b=1}^{B} M_b$.

In current feedback systems, coefficient feedback is feedback of amplitude and phase values of the entries in matrix C. For the bth beam (i.e., for the bth row in matrix C), a beam-specific amplitude, such as a wideband amplitude value, is reported using $A_b$ bits, and a beam-specific phase, such as wideband phase value, is reported using $P_b$ bits. For each coefficient in different subbands for the bth beam (i.e., for the entries in the bth row in matrix C), a differential amplitude value based on the beam-specific amplitude value (e.g., measured over a wideband rather than per-subband) is reported using $A_b^{(sb)}$ bits, and a differential phase value based on the wideband phase value is reported using $P_b^{(sb)}$ bits.

In some feedback systems, coefficients in current feedback systems can be transferred into a transfer domain. Provided the number of non-zero coefficients in the transfer domain is sparse, by reporting the dominant coefficients in the transfer domain instead of in the original domain, overhead of reporting can be reduced. Particularly, coefficient feedback is feedback of the amplitude and phase values of the entries (or a subset of the entries) in matrix V. For the bth beam (i.e., for the bth row in matrix C), a beam-specific amplitude, such as a wideband amplitude value, is reported using $A_b$ bits, and a beam-specific phase, such as a wideband phase value, is reported using $P_b$ bits. For each selected coefficients associated with the bth beam (i.e., for the entries in the bth row in matrix V), a differential amplitude value based on the beam-specific amplitude value is reported using $A_b^{(sb)}$ bits, and a differential phase value based on the beam-specific phase value is reported using $P_b^{(sb)}$ bits. The selection of coefficients is further described below.

For each row in matrix V, only non-zero coefficient entries are feedback in some feedback systems, and the overall quantity of coefficients and overhead in some feedback systems can be reduced compared to current feedback systems. However, the side effect of such compression is that the beam reconstruction at the BS may not be as accurate as a non-compressed beam reconstruction.

In some feedback systems, the overall quantity of coefficients in the transferred domain associated with all spatial beams (i.e., the overall quantity of non-zero entries of matrix V) can be configured to the UE as a parameter known by both the UE and the BS. This configuration becomes an initial constraint for the UE to select the non-zero coefficients of matrix V to feedback in the transferred domain. Such initial constraint allows the UE to select different quantities of coefficients associated with different spatial beams. For example, the UE can decide to make different rows of the matrix V have different quantity of non-zero entries. Accordingly, the compression becomes more flexible on the UE side.

There are several methods to address details of configuration and feedback schemes, when the overall quantity of coefficients to feedback in the transferred domain can be configured as a parameter. A first method is to use a bitmap with bit-width equaling M to indicate the selection and number of coefficients for each beam. A second method is to explicitly feedback the number of selected coefficients in each beam. The number of bits used for such feedback depends on the discrete Fourier transform (DFT) basis' dimensions M, or an additional constraint on the number of coefficients that can be selected for a certain beam $\overline{M}$. In one version of this second method, the number of bits used for such feedback depends on the number of coefficients selected to feedback for the considered beam. In another version of the second method, bit-points are used to indicate a certain choice of location of the coefficients for each beam, and the number of bits used for such feedback depends on the number of coefficients selected to feedback for the considered beams, as well as the dimensions of the DFT basis M.

Despite methods to address details of configuration and feedback schemes, to feedback the specific quantity of coefficients associated with different beams would increase the overhead.

Example Beam-Strength Related CSI Coefficient Feedback

Certain embodiments described herein relate to transmitting beam-strength related CSI coefficient feedback to the BS in order to reduce the overhead associated with the CSI feedback. Beam-strength related CSI includes various beam-specific amplitude and phase information, such as wideband amplitude and phase and differential amplitude and phase. In some feedback systems, differential amplitude feedback can be used to report each coefficient's amplitude. Specifically, beam-specific amplitude, such as wideband amplitude per beam, is given, and then differential amplitudes for the coefficients associated with the same beam can be additionally reported. In certain embodiments described herein, beam-specific amplitude orders are used to associate the quantity of coefficients, where the quantity of coefficients between different beams is also differentially reported in ascending or descending order based on the beam strengths, thereby reducing overhead. In certain embodiments, overhead can be reduced by considering different quantization levels for beams with different strengths (i.e., different wideband amplitudes).

Figure 9:
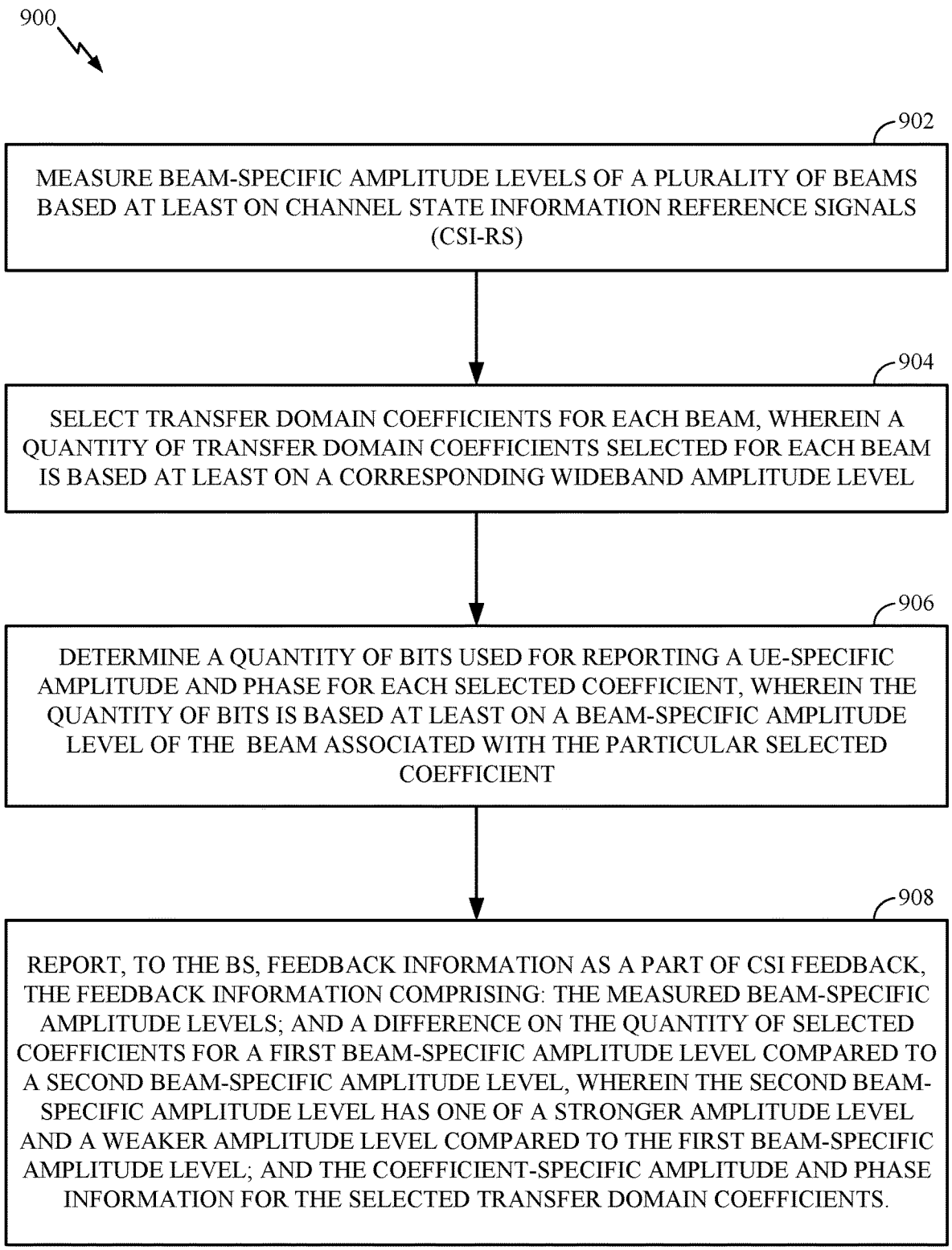
FIG. 9 illustrates example operations performed by a user equipment (UE), according to aspects of the present disclosure.

FIG. 9 illustrates example operations 900 performed by a user equipment (e.g., UE 120), according to aspects of the present disclosure.

Operations 900 begin, at 902, with the UE measuring beam-specific amplitude levels of a plurality of beams based at least on channel state information reference signals (CSI-RS). In one aspect, the beam-specific amplitude levels can be based on the wideband amplitude levels of the plurality of beams. In one aspect, the channels state information reference signals are transmitted from a base station (BS).

In one aspect, the beam-specific amplitude levels are sorted according to an identified level order. The identified level order can be an ascending order of the beam-specific amplitude levels, or a descending order of the beam-specific amplitude levels.

At 904, the UE selects transfer domain coefficients for each beam, wherein a quantity of transfer domain coefficients selected for each beam is based on at least the corresponding wideband amplitude level. In one aspect, selecting the transfer domain coefficients is based at least on selecting the transfer domain coefficients from a coefficient compression matrix, with a constraint on a total quantity of selected transfer domain coefficients ($M_{total}$), for reporting coefficient-specific amplitude and phase information to a base station (BS). In one aspect, the transfer domain of the transfer domain coefficients can be based on a discrete Fourier transfer (DFT) basis or a discrete cosine transfer (DCT). In one aspect, the coefficient-specific amplitude and phase information comprises coefficient-specific amplitude and phase values. In such aspect, the coefficient-specific amplitude value can be based on a beam-specific amplitude value, and the coefficient-specific phase value is based on a coefficient-specific differential phase value based on a beam-specific phase value. In another aspect, a higher quantity of transfer domain coefficients are selected for beams with higher beam-specific amplitude levels relative to beams with lower beam-specific amplitude levels.

In one aspect, the coefficient compression matrix comprises rows that represent an overall quantity of the plurality of beams, and columns representing an overall quantity of the selected transfer domain coefficients. Each row of the coefficient compression matrix represents transfer domain coefficients associated with a particular beam of the plurality of beams, and each element of the particular row represents the coefficient-specific and/or the beam-specific amplitude and phase information regarding a particular coefficient associated with the particular beam.

At 906, the UE determines a quantity of bits used for reporting a UE-specific amplitude and phase for each selected coefficient, wherein the quantity of bits is based at least on a beam-specific amplitude level of a beam associated with a selected coefficient of the selected transfer domain coefficients.

At 908, the UE reports, to the BS, feedback information as a part of CSI feedback. The feedback information includes: the measured beam-specific amplitude levels; and a difference on the quantity of selected coefficients for a first beam-specific amplitude level compared to a second beam-specific amplitude level, wherein the second beam-specific amplitude level has one of a stronger amplitude level and a weaker amplitude level compared to the first beam-specific amplitude level; and the coefficient-specific amplitude and phase information for the selected transfer domain coefficients.

In some aspects, the UE may also determine the quantity of transfer domain coefficients to select for each beam, and indicating, to the BS, the quantity of transfer domain coefficients selected for each beam. In some aspects, the determination is based on a constraint on a total quantity of transfer domain coefficients allowed to be selected. In some aspects, the indicating comprises providing an indication of a first quantity of transfer domain coefficients selected for one or more beams associated with a first beam-specific amplitude level, and providing at least one differential value, relative to the first quantity, to indicate at least a second quantity of transfer domain coefficients selected for one or more beams associated with at least one second beam-specific amplitude level. In some aspects, the indication of the first quantity of transfer domain coefficients is based on at least one of: an explicit quantity of transfer domain coefficients, and a differential value relative to a second quantity of coefficients based on a differential value.

In some aspects, the UE omits a last indication for a last beam-specific amplitude value according to a level order, where the quantity of coefficients of the last beam-specific amplitude level is determined based on the constraint on the total quantity of selected coefficients. In one aspect, the at least one differential value comprises a value equal to or less than zero when level order is based on a descending order. In one aspects, the at least one differential value comprises a value equal to or greater than zero when the level order is based on an ascending order. In one aspect, the UE receives signaling indicating the at least one differential value.

In some aspects, the UE determines the quantity of transfer domain coefficients to select for each beam based on a quantity of transfer domain coefficients associated with each beam-specific amplitude level. In one aspect, the quantity of transfer domain coefficients associated with each beam-specific amplitude level is determined based on radio resource control (RRC) configuration signaling, downlink control information (DCI) signaling, a predefined association, and any combination thereof.

In some aspects, selecting the coefficients involves omission rules to limit the quantity of coefficients selected based on the constraint of selected transfer domain coefficients. In one aspect, the omission rules are based on the beam-specific amplitude levels of the plurality of beams. The omission rules comprise sequentially omitting one or more transfer domain coefficients associated with each of the plurality of beams based on a one-coefficient-per-beam basis or a multiple-coefficient-per-beam basis, and sequentially omitting uses a sequence based on the strength of the beam-specific amplitude level of each of the plurality of beams. The one-coefficient-per-beam basis comprises omitting a transfer domain coefficient associated with a first beam before omitting a transfer domain coefficient association with a second beam, and so forth going through the beams sequentially, going back to the first beam if the total quantity of selected transfer domain coefficients is not equal to or less than the constraint. The multiple-per-beam basis comprises omitting multiple transfer domain coefficients associated with a first beam before going to the second beam to omit coefficients of the second beam. Under the multiple-coefficients-per-beam basis, all the transfer domain coefficients of one beam may be omitted before going to the next beam to omit the coefficients of the next beam.

In one aspect, the UE determines quantization levels for the coefficient-specific amplitude and phase information reported for the plurality of beams based on the beam-specific amplitude levels. In one aspect, the UE sorts coefficient specific amplitude and phase information for different domain coefficients according to any combination of the following: an order based on the beam-specific amplitude levels associated with each transfer domain coefficient; an order based on beam indices for the beams having the same beam-specific amplitude levels; and an order based on each transfer domain coefficient's column index within the coefficient compression matrix for the coefficients associated with the same beam. In one aspect, the quantization levels are based on radio resource control (RRC) configuration signaling, downlink control information (DCI) signaling, predefined association, and any combination thereof.

Figure 10:
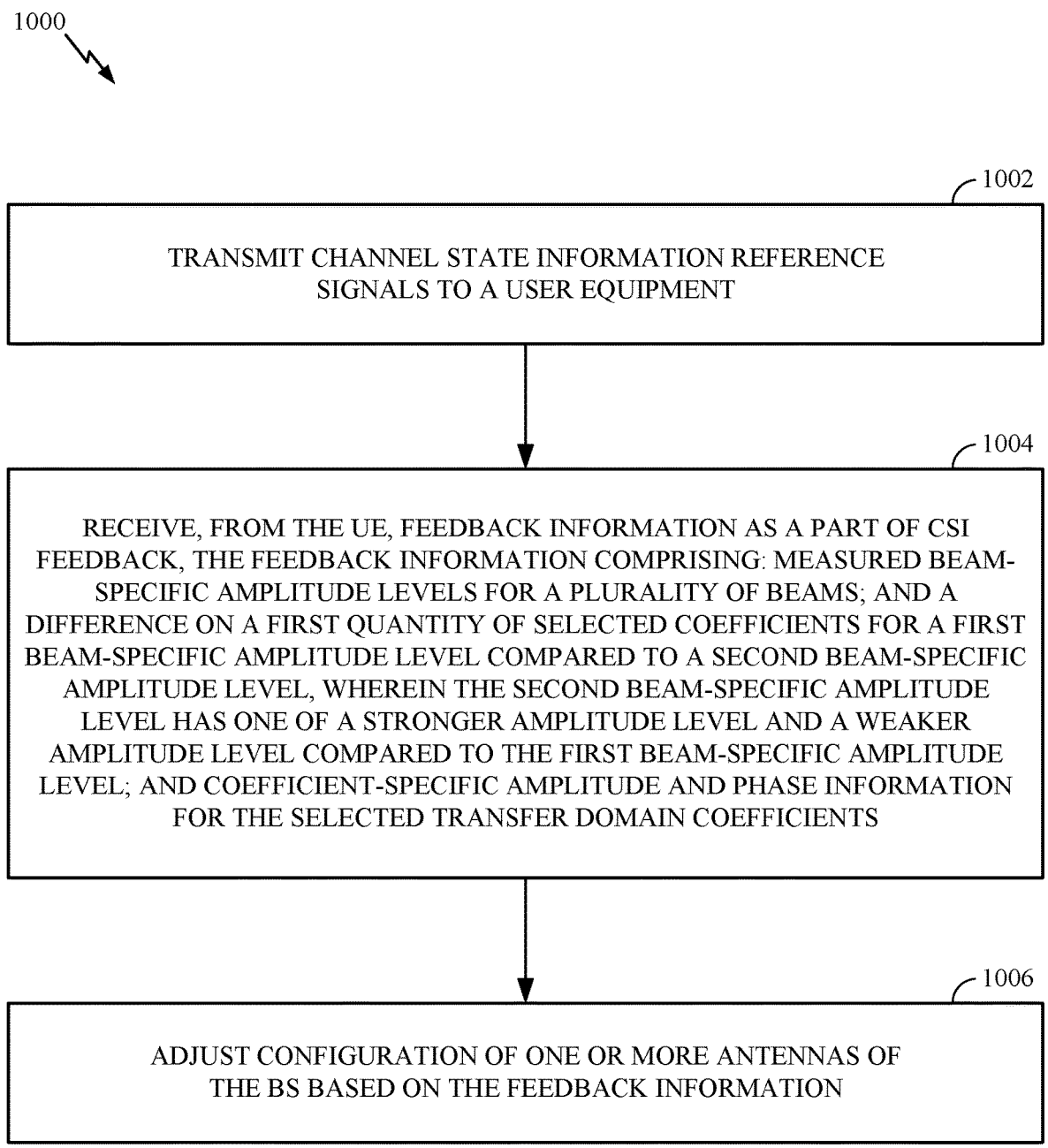
FIG. 10 illustrates example operations performed by a base station (BS), according to aspects of the present disclosure.

FIG. 10 illustrates example operations 1000 performed by a base station (BS) (e.g., BS 110), according to aspects of the present disclosure.

Operations 1000 begin, at 1002, with the BS transmitting channel state information reference signals to a user equipment (UE).

At 1004, the BS receives from the UE feedback information as a part of CSI feedback, the feedback information comprising: the measured beam-specific amplitude levels; a difference between a first quantity of selected transfer domain coefficients for a first beam-specific amplitude level and a second quantity of selected transfer domain coefficients for a second beam-specific amplitude level, wherein the second beam-specific amplitude level has one of a stronger amplitude level and a weaker amplitude level compared to the first beam-specific amplitude level, and coefficient-specific amplitude and phase information for the selected transfer domain coefficients.

At 1006, the BS adjusts a configuration of one or more antennas of the BS based on the feedback information.

FIG. 11 illustrates an example of a beam-strength related Type-II coefficient feedback process, according to aspects of the present disclosure.

As mentioned, feedback of the quantity of coefficients for each beam can reduce overhead by considering the beam-specific amplitude levels, such as wideband amplitude levels, of the different beams. Certain beams are selected, and the beam-specific amplitude and phase are reported for selected beams. As noted above, the beam-specific feedback may be wideband amplitude values. For the bth beam (i.e., for the bth row in matrix C), a beam-specific amplitude is reported with $A_b$ bits and a beam-specific phase value is reported using $P_b$ bits. The beam-specific amplitude values by the $A_b$ bits for the different beams can be ordered in a particular order (i.e., descending order or ascending order). The beam-specific amplitude values can be translated to the same metric even if different beams use different quantities of bits (i.e., $A_{b_i} \neq A_{b_j}$, $b_i \neq b_j$), based on certain formulations or some predefinitions in standards. The selected beams are reordered based on the particular order (i.e., record the rows for matrix V), such that the beams are newly ordered following the particular order of the beam-specific amplitude values of the beams. In such reordering, if there are multiple beams having identical values in the metric, it is supposed that these beams are further ordered according to the particular order of their beam indices in the codebook. The selected quantities of coefficients are differentially fed back according to the beam-specific amplitude levels of the different beams.

For beams with the strongest beam-specific amplitude level, if there is a threshold on the quantity of coefficients in the transferred domain that can be selected for a certain beam (i.e., the quantity of entries that can be selected to feedback in any row of matrix V), namely $\overline{M}$, then a quantity of $\lceil \log_2 \overline{M} \rceil$ bits can be used to indicate the quantity of coefficients selected for these beams with the strongest beam-specific amplitude level. Otherwise, a quantity of $\lceil \log_2 M \rceil$ bits can be used to indicate the quantity of selected coefficients for the beams with the strongest beam-specific amplitude level.

For beams with amplitude levels that are not the strongest, $\lceil \log_2 D \rceil$ bits can be used to indicate D states of decreasing quantity of coefficients comparing to the beams with the last amplitude level being stronger than the considered beams' amplitude level. For example, the first state indicates that the quantity of coefficients for the considered beams is the same as the beams with the last amplitude level (i.e., the beams with the strongest beam-specific amplitude level). The dth state indicates that the quantity of coefficients for the considered beams is Kd less than the beams with the last amplitude level, where the value of K may be RRC configured or DCI indicated (e.g., the quantity of coefficients for beams with the second strongest beam-specific amplitude level is one less than the quantity of coefficients for the beams with the strongest beam-specific amplitude level). The beams with the weakest beam-specific amplitude level do not need to feedback this information because the BS can interpret this information based on the constraint of $M_{total}$.

During the feedback, the constraint on the total quantity of coefficient to feedback (i.e., the number of $M_{total}$) is maintained. Maintaining the constraint can be a joint decision among the quantity of beams within a certain amplitude level and the quantity of selected coefficients for each amplitude level.

In this exemplary embodiment shown in FIG. 11, the rank of the DFT basis is M=8, the number of beams is B=8, and the overall number of coefficients to feedback $M_{total}$=13. The number of subbands is $N_{sb}$=19, and there are overall two beam-specific amplitude levels where the higher beam-specific amplitude level requires 2 coefficients and the lower beam-specific amplitude level require one coefficient. In this exemplary embodiment, the quantity of coefficients is not configured by the UE and the associations between amplitude level and the quantity of coefficients per beam is not RRC configured. The beam-specific amplitude levels and corresponding quantities of coefficients for each beam are re-ordered according to their beam-specific amplitude levels and shown in the table in FIG. 11.

In the example of FIG. 11, the exemplary embodiment is applied to several methods to address details of configuration and feedback schemes mentioned previously. For example, for the first method of using a bit-map to feedback quantity and location, the overhead to feedback the coefficients' quantity and location is B×M=8×8=64 bits. For one version of the second method using explicit feedback of location of coefficients, the overhead for feedback the coefficients' number and location is $B\lceil \log_2 M \rceil + \Sigma_{b=1}^{B}(M_b \lceil \log_2 M \rceil)$=8×3+3×13=24+39=63 bits. For another version of the second method using bit-points to indicate a certain choice of location of the coefficients for each beam, the overhead for feedback the coefficients' number and location is $B\lceil \log_2 M \rceil + \Sigma_{b=1}^{B}(\lceil \log_2 C_M^{M_b} \rceil) = 8 \times 3 + 3 \times 3 + 5 \times 5 = 24 + 34 = 58$ bits.

The exemplary embodiment is applied to further reduce overhead. In the exemplary embodiment, $M_b$ values are decided by the UE. The first beam-specific amplitude level needs to be report that it uses two coefficients per beam. The quantity of coefficients used by the other beams can be determined by the BS based on the constraint of $M_{total}$. Thus the feedback of quantity of coefficients per beam requires only $\lceil \log_2 M \rceil = 3$ bits. The overhead for feedback of the coefficients' quantity and location, based on one version of the second method using explicit feedback of location of coefficients, is $\lceil \log_2 M \rceil + \Sigma_{b=1}^{B}(M_b \lceil \log_2 M \rceil) = 3 + 3 \times 13 = 3 + 39 = 42$ bits. The overhead for feedback of the coefficients' quantity and location, based on another version of the second method using bit-points to indicate a certain choice of location of the coefficients for each beam, is $\lceil \log_2 M \rceil + \Sigma_{b=1}^{B}(\lceil \log_2 C_M^{M_b} \rceil) = 3 + 3 \times 3 + 5 \times 5 = 3 + 34 = 37$ bits. As shown, the exemplary embodiment reduces the quantity of bits and thus reduces overhead.

FIG. 12 illustrates an example of a beam-strength related Type-II coefficient feedback process, according to aspects of the present disclosure. As mentioned, the quantity of selected coefficients for a certain beam is associated with the considered beam's beam-specific amplitude level. This association between the quantity of selected coefficients and the beam-specific amplitude level of the considered beam can be RRC configured, DCI indicated, predefined by standard, or any combination of the above. In the exemplary embodiment, the communications devices follow such associations to determine the quantity of selected coefficients for different beams, and there is no need to feedback the number of coefficients for different beams.

However, only following such associations can violate the constraint on the overall quantity of coefficients for all beams (i.e., the number of $M_{total}$). Thus certain coefficient omission rules need to be defined as follows. One omission rule is the one-coefficient-per-beam basis. For example, the one-coefficient-per-beam basis involves omitting one coefficient from the weakest beam, then omitting one coefficient from the second weakest beam, and repeating this omission process until one coefficient is omitted from the strongest beam. Then, the one-coefficient-per-beam basis goes back to the weakest beam to omit another coefficient, then omitting another coefficient from the second weakest beam, and repeating this omission process until the constraint on the overall quantity of selected coefficients is met. Another omission rule is the multiple-coefficient-per-beam basis. For example, the multiple-coefficient-per beam basis involves omitting one coefficient from the weakest beam, then omitting another coefficient from the weakest beam, and repeating this omission process until there are no more coefficients in the weakest beam or the constraint on the overall quantity of selected coefficients is met. Then, the multiple-coefficient-per-beam basis goes to the second weakest beam and omits one coefficient from this second weakest beam, and continues omitting coefficients until there are no more coefficients in the second weakest beam or the constraint on the overall quantity of selected coefficients is met. This omission process occurs sequential going from the weakest beam to the strongest beam until the constraint on the overall quantity of selected coefficients is met.

In this exemplary embodiment, the number of beams is B=8, and the overall number of coefficients to feedback is $M_{total}$=26, and the number of subbands is $N_{sb}$=19. There are 3 wideband amplitude levels: the strongest beam-specific amplitude level requires 4 coefficients per beam; the second strongest beam-specific amplitude level requires 3 coefficients per beam; and the third strongest beam-specific amplitude level requires 2 coefficients per beam. In the exemplary embodiment, the quantity of coefficients required per beam is RRC configured. The beam-specific amplitude levels and corresponding quantities of coefficients for each beam are re-ordered according to their beam-specific amplitudes and are shown in the table of FIG. 12.

Because the association between beam-specific amplitude level and the quantity of coefficients per beam is RRC configured, the overall quantity of coefficients following the RRC configuration of associations between amplitude level and the quantity of coefficients totals to 28, which is 2 more than $M_{total}$. Accordingly omission rules are applied to the quantity of coefficients so that the quantity of coefficients is equal to or less than $M_{total}$.

In one embodiment, the one-coefficient-per-beam basis is used. The omission rules goes through the beams, removing one coefficient from the beams with the weakest beam-specific amplitude level before moving to another beam. In this exemplary embodiment, a coefficient is removed from the $8^{th}$ beam and 1 coefficient is removed from the $7^{th}$ beam. In one embodiment, the UE chooses which coefficients in specific location to remove.

In one embodiment, the multiple-coefficients-per-beam basis is used. The omission rules goes through the beams, removing any quantity of coefficients from the weakest beam-specific amplitude level before moving to another beam for removal of coefficients. In the exemplary embodiment, all 2 coefficients are removed from the $8^{th}$ beam. This corresponds to the case that the beam-specific amplitude and phase values are still reported but the differential values of the coefficients in the transferred domain are not provided because the beam's amplitude level is the lowest and thus this beam's coefficients' information can be compressed.

By using omission rules, the number of coefficients per beam is reduced and therefore reduces overhead.

FIG. 13 illustrates an example of a beam-strength related Type-II coefficient feedback process, according to aspects of the present disclosure. This exemplary embodiment involves differential quantization levels according to beam-specific amplitude levels. This exemplary embodiment supposes that there are total T beam-specific amplitude levels and that for the #t beam-specific amplitude level, a quantity of $A_t$ bits are used for the sub-band amplitude feedback, and a quantity of $P_t$ bits are used for the sub-band phase feedback.

Consequently, for the beams with a certain beam-specific amplitude level, each selected coefficient uses $A_t$ bits to feedback its differential amplitude, and uses $P_t$ bits to feedback its differential phase. For the beams with the considered beam-specific amplitude level (supposedly the #t level), the number of selected coefficients for each beam is M'. Thus the overall number of bits for the differential amplitude and phase feedback regarding each considered beam is $M'(A_t+P_t)$. Additionally, the reported coefficients' differential amplitude and phase values are ascendingly ordered according to the corresponding re-ordered beams' orders based on the beam-specific amplitudes of the beams, and according to the coefficients' indexes within the considered beam (i.e., the column indexes in matrix V of the coefficients). Furthermore, the association between the beam-specific amplitude levels and their corresponding differential quantization levels can be based at least on RRC configuration, DCI indication, predefinition in standards, or any combination thereof.

In the exemplary embodiment, the number of beams is B=8, the number of coefficients to feedback is $M_{total}$=26, and the number of subbands is $N_{sb}$=19. There are overall three beam-specific amplitude levels, and all beam-specific amplitude levels use 3 bits to feedback beam-specific amplitude and 1 bit to feedback beam-specific phase. The strongest beam-specific amplitude requires 4 coefficients per beam, 3 bits for differential amplitude quantization, and 3 bits for differential phase quantization. The second strongest beam-specific amplitude requires 3 coefficients per beam, 2 bits for differential amplitude quantization, and 2 bits for differential phase quantization. The $3^{rd}$ strongest beam-specific amplitude level requires 2 coefficients per beam, 1 bit for differential amplitude quantization, and 1 bit for differential phase quantization. In the exemplary embodiment, the quantity of coefficients per beam and the differential amplitude and phase quantization are both RRC configured. The beam-specific amplitude levels and corresponding quantities of coefficients for each beam are re-ordered according to their beam-specific amplitudes and are shown in the table of FIG. 13.

Based on the information of the exemplary embodiment, the overhead to report the first 2 beams' differential amplitude and phase values is 4×2×(3+3)=48 bits. The overhead to report the following 4 beams' differential amplitude and phase values is 3×4×(2+2)=48 bits. The overhead to report the last 2 beams' differential amplitude and phase values is 2×2×(1+1)=8 bits. The overhead to feedback beam-specific amplitude and phase values for all beams is (3+1)×8=32 bits. The overall overhead to feedback amplitude and phase values of the coefficients is 48+48+8+32=136 bits. As shown, the exemplary embodiment reduces the quantity of bits and thus reduces overhead.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations (e.g., operations described in FIGS. 9-10) described herein. For example, operations 900 may be performed by processors 466, 458, 464 of UE 120 in FIG. 4 while operations 1000 may be performed by processors 420, 460, 438 of BS 110.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
    measuring beam-specific amplitude levels of a plurality of beams based at least on channel state information reference signals (CSI-RS);
    selecting transfer domain coefficients for each beam, wherein a quantity of transfer domain coefficients selected for each beam is based at least on the corresponding beam-specific amplitude level;
    determining a quantity of bits used for reporting a UE-specific amplitude and phase for each selected coefficient, wherein the quantity of bits is based at least on the beam-specific amplitude level of the beam associated with the particular selected coefficient; and
    reporting feedback information to a base station (BS), as a part of CSI feedback, the feedback information comprising:
        the measured beam-specific amplitude levels; and
        a difference on the quantity of selected coefficients for a first beam-specific amplitude level compared to a second beam-specific amplitude level, wherein the second beam-specific amplitude level has one of a stronger amplitude level and a weaker amplitude level compared to the first beam-specific amplitude level, and the coefficient-specific amplitude and phase information for the selected coefficients.

2. The method of claim 1, wherein selecting transfer domain coefficients is based at least on selecting the transfer domain coefficients from a coefficient compression matrix, with a constraint on the total quantity of selected coefficients, for reporting coefficient-specific amplitude and phase information to the BS.

3. The method of claim 2, wherein the coefficient compression matrix comprises
   rows representing the overall quantity of the plurality of beams, each row representing the transfer domain coefficients associated with a beam of the plurality of beams, wherein an element with a particular row represents the coefficient-specific and/or the beam-specific amplitude and phase information regarding a particular coefficient associated with the beam; and
   the quantity of columns represents the overall quantity of transfer domain coefficients available for each beam.

4. The method of claim 1, wherein a transfer domain of the transfer domain coefficients is based on one of a discrete Fourier transform (DFT) basis domain or a discrete cosine transfer (DCT) domain.

5. The method of claim 1, wherein the beam-specific amplitude levels are sorted according to an identified level order, wherein the identified level order is one of an ascending order of the beam-specific amplitude levels, and a descending order of the beam-specific amplitude levels.

6. The method of claim 1, wherein the beam-specific amplitude level is based at least on a wideband amplitude level of the beam.

7. The method of claim 1, wherein:
   the coefficient-specific amplitude value is based at least on a coefficient-specific differential amplitude value based on a beam-specific amplitude value; and
   the coefficient-specific phase value is based at least on a coefficient-specific differential phase value based on a beam-specific phase value.

8. The method of claim 1, wherein a higher quantity of coefficients is selected for beams with higher beam-specific amplitude levels relative to beams with lower beam-specific amplitude levels.

9. The method of claim 1, further comprising:
   determining the quantity of transfer domain coefficients to select for each beam; and
   indicating, to the BS, the quantity of transfer domain coefficients selected for each beam;
   wherein the determination is based on a constraint on a total quantity of transfer domain coefficients allowed to be selected;
   wherein the indicating comprises:
      providing an indication of a first quantity of transfer domain coefficients selected for one or more beams associated with a first beam-specific amplitude level; and
      providing at least one differential value, relative to the first quantity, to indicate at least one second quantity of transfer domain coefficients selected for one or more beams associated with at least one second beam-specific amplitude level.

10. The method of claim 9, wherein: the indication of the first quantity of transfer domain coefficients is based on at least one of:
   an explicit quantity of transfer domain coefficients; and
   a differential value relative to a second quantity of coefficients based on a differential value;
   wherein the method further comprises: omitting a last indication for a last beam-specific amplitude level according to a level order, wherein the quantity of coefficients of the last beam-specific amplitude level is determined based on the constraint on the total quantity of selected coefficients;
   wherein the at least one differential value comprises one of the following:
      a value equal to or less than zero when the level order is based on a descending order; or
      a value equal to or greater than zero when the level order is based on an ascending order;
   wherein the method further comprises receiving signaling indicating the at least one differential value.

11. The method of claim 1, further comprising:
   determining the quantity of transfer domain coefficients to select for each beam based on a quantity of transfer domain coefficients associated with each beam-specific amplitude level.

12. The method of claim 11, wherein the quantity of transfer domain coefficients associated with each beam-specific amplitude level is determined based on at least one of: radio resource control (RRC) configuration signaling, downlink control information (DCI) signaling, or a predefined association.

13. The method of claim 1, wherein:
   selecting the coefficients involves omission rules to limit the quantity of coefficients selected based on the constraint of the total quantity of selected coefficients;
   wherein the omission rules are based on the beam-specific amplitude levels of the plurality of beams;
   wherein the omission rules comprise one of the following:
      sequentially omitting one or more transfer domain coefficients associated with each of the plurality of beams based on a one-coefficient-per-beam basis, wherein sequentially omitting uses a sequence based on strength of the beam-specific amplitude level of each of the plurality of beams; or
      sequentially omitting one or more transfer domain coefficients associated with each of the plurality of beams based on a multiple-coefficient-per-beam basis, wherein sequentially omitting uses a sequence based on strength of the beam-specific amplitude level of each of the plurality of beams.

14. The method of claim 1, further comprising at least one of the following:
   determining quantization levels for the coefficient-specific amplitude and phase information reported for the plurality of beams based on the beam-specific amplitude levels; and
   sorting the reported coefficient-specific amplitude and phase information for different transfer domain coefficient according to at least one of the following:
      an order based on the beam-specific amplitude levels associated with each transfer domain coefficient,
      an order based on beam indices for the beams having the same beam-specific amplitude levels, and
      an order based on each transfer domain coefficient's column index within the coefficient compression matrix for the coefficients associated with the same beam;
   wherein the quantization levels are based on at least one of: radio resource control (RRC) configuration signaling, downlink control information (DCI) signaling, or a predefined association.

15. A method for wireless communications by a base station (BS), comprising:
   transmitting channel state information reference signals (CSI-RS) to a user equipment (UE);
   receiving, from the UE, feedback information as a part of CSI feedback, the feedback information comprising:
      measured beam-specific amplitude levels for a plurality of beams;
      a difference on a first quantity of selected coefficients for a first beam-specific amplitude level compared to a second beam-specific amplitude level, wherein the second beam-specific amplitude level has one of a stronger amplitude level and a weaker amplitude level compared to the first beam-specific amplitude level, and coefficient-specific amplitude and phase information for the selected transfer domain coefficients; and adjusting a configuration of one or more antennas of the BS based on the feedback information.

16. The method of claim 15, wherein a transfer domain of the transfer domain coefficients is based on one of a discrete Fourier transform (DFT) basis domain or a discrete cosine transfer (DCT) domain.

17. The method of claim 15, wherein the beam-specific amplitude levels are sorted according to an identified level order, wherein the identified level order is one of an ascending order of the beam-specific amplitude levels, and a descending order of the beam-specific amplitude levels.

18. The method of claim 15, wherein the beam-specific amplitude level is based at least on a wideband amplitude level of the beam.

19. The method of claim 15, wherein:
the coefficient-specific amplitude value is based at least on a coefficient-specific differential amplitude value based on a beam-specific amplitude value; and
the coefficient-specific phase value is based at least on a coefficient-specific differential phase value based on a beam-specific phase value.

20. The method of claim 15, wherein a coefficient compression matrix comprises
rows representing the overall quantity of the plurality of beams, each row representing the transfer domain coefficients associated with a beam of the plurality of beams, wherein an element with a particular row represents the coefficient-specific and/or the beam-specific amplitude and phase information regarding a particular coefficient associated with the beam; and
the quantity of columns represents the overall quantity of transfer domain coefficients available for each beam.

21. The method of claim 15, further comprises:
receiving an indication of a first quantity of transfer domain coefficients selected for one or more beams associated with a first beam-specific amplitude level; and
receiving at least one differential value, relative to the first quantity, to indicate at least one second quantity of transfer domain coefficients selected for one or more beams associated with at least one second beam-specific amplitude level.

22. The method of claim 21, wherein: the indication of the first quantity of transfer domain coefficients is based on at least one of:
an explicit quantity of transfer domain coefficients; and
a differential value relative to a second quantity of coefficients based on a differential value.

23. The method of claim 21, wherein the at least one differential value comprises one of the following:
a value equal to or less than zero when the level order is based on a descending order; or
a value equal to or greater than zero when the level order is based on an ascending order.

24. The method of claim 21, further comprising transmitting signaling to the UE indicating the at least one differential value.

25. The method of claim 15, further comprising:
determining the quantity of transfer domain coefficients to select for each beam based on a quantity of transfer domain coefficients associated with each beam-specific amplitude level.

26. The method of claim 25, further comprising providing an indication of the quantity of transfer domain coefficients associated with each beam-specific amplitude level via at least one of: radio resource control (RRC) configuration signaling, downlink control information (DCI) signaling, or a predefined association.

27. The method of claim 15, further comprising determining quantization levels for the coefficient-specific amplitude and phase information reported for the plurality of beams based on the beam-specific amplitude levels.

28. The method of claim 27, further comprising providing an indication of the quantization levels via at least one of: radio resource control (RRC) configuration signaling, downlink control information (DCI) signaling, or a predefined association.

29. An apparatus for wireless communications, comprising:
a memory; and
at least one processor coupled to the memory, the memory comprising instructions executable by the at least one processor to cause the apparatus to:
measure beam-specific amplitude levels of a plurality of beams based at least on channel state information reference signals (CSI-RS);
select transfer domain coefficients for each beam, wherein a quantity of transfer domain coefficients selected for each beam is based at least on the corresponding beam-specific amplitude level;
determine a quantity of bits used for reporting a user equipment (UE)-specific amplitude and phase for each selected coefficient, wherein the quantity of bits is based at least on the beam-specific amplitude level of the beam associated with the particular selected coefficient; and
report feedback information to a base station (BS), as a part of CSI feedback, the feedback information comprising:
the measured beam-specific amplitude levels; and
a difference on the quantity of selected coefficients for a first beam-specific amplitude level compared to a second beam-specific amplitude level, wherein the second beam-specific amplitude level has one of a stronger amplitude level and a weaker amplitude level compared to the first beam-specific amplitude level, and the coefficient-specific amplitude and phase information for the selected coefficients.

30. An apparatus for wireless communications, comprising:
a memory; and
at least one processor coupled to the memory, the memory comprising instructions executable by the at least one processor to cause the apparatus to:
transmit channel state information reference signals (CSI-RS) to a user equipment (UE);
receive, from the UE, feedback information as a part of CSI feedback, the feedback information comprising:
measured beam-specific amplitude levels for a plurality of beams;
a difference on a first quantity of selected coefficients for a first beam-specific amplitude level compared to a second beam-specific amplitude level, wherein the second beam-specific amplitude level has one of a stronger amplitude level and a weaker amplitude level compared to the first beam-specific amplitude level, and coefficient-specific amplitude and phase information for the selected transfer domain coefficients; and adjust a configuration of one or more antennas of a base station (BS) based on the feedback information.

\* \* \* \* \*